(12) United States Patent
Craig

(10) Patent No.: US 7,357,604 B2
(45) Date of Patent: Apr. 15, 2008

US007357604B2

(54) INDEXABLE CUTTING INSERT WITH POSITIVE AXIAL RAKE ANGLE AND MULTIPLE CUTTING EDGES

(75) Inventor: Karen A. Craig, Greensburg, PA (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 11/471,046

(22) Filed: Jun. 20, 2006

(65) Prior Publication Data
US 2007/0292219 A1 Dec. 20, 2007

(51) Int. Cl.
*B23B 27/16* (2006.01)
(52) U.S. Cl. .................. 407/113; 407/42; 407/115
(58) Field of Classification Search .................. 407/42, 407/113–117, 33, 101
See application file for complete search history.

(56) References Cited

U.S. PATENT DOCUMENTS

| | | | |
|---|---|---|---|
| 4,294,566 A | | 10/1981 | Boone |
| 4,636,116 A | * | 1/1987 | Shikata ........................ 407/103 |
| 5,442,981 A | * | 8/1995 | Vegh ........................... 82/1.11 |
| 5,639,189 A | | 6/1997 | Hoefler |
| 5,810,518 A | * | 9/1998 | Wiman et al. ................ 407/102 |
| 5,820,308 A | | 10/1998 | Hoefler |
| 5,855,457 A | * | 1/1999 | Arai et al. .................... 407/40 |
| 6,050,751 A | * | 4/2000 | Hellstrom .................... 407/104 |
| 6,053,672 A | | 4/2000 | Satran et al. |
| 6,769,844 B2 | | 8/2004 | Waggle |
| 6,811,359 B2 | | 11/2004 | Craig |
| 6,929,428 B1 | | 8/2005 | Wermeister et al. |
| 2005/0063792 A1 | | 3/2005 | Satran |

FOREIGN PATENT DOCUMENTS

| | | |
|---|---|---|
| DE | 1232436 | 1/1967 |
| EP | 1480774 B1 | 6/2006 |
| EP | 1572407 B1 | 1/2007 |
| WO | WO/03/074218 A1 | 9/2003 |

* cited by examiner

*Primary Examiner*—Willmon Fridie, Jr.
(74) *Attorney, Agent, or Firm*—Larry R. Meenan (57) ABSTRACT

An indexable cutting insert includes a first component with an outer or top surface and side surfaces. A third component is mirror symmetric with respect to the first component about a vertical or y-axis of the cutting insert. A second component is disposed between the first and third components. Multiple cutting edges are defined at an intersection between the side surfaces and the top surface, wherein the cutting edges define a positive axial rake angle. In one embodiment, the first and third components are in the shape of a polygonal with a star appearance, and the second component is in the shape of a square. The first and third components are offset from one another by a first offset angle, while the second component is offset from the first and third components by a second offset angle to allow the cutting insert to be indexable.

18 Claims, 8 Drawing Sheets

INDEXABLE CUTTING INSERT WITH POSITIVE AXIAL RAKE ANGLE AND MULTIPLE CUTTING EDGES

BACKGROUND OF THE INVENTION

Tangential cutting inserts, also known as on-edge, or lay down, cutting inserts, are oriented in an insert holder in such a manner that during a cutting operation on a workpiece the cutting forces are directed along a major (thicker) dimension of the cutting insert. An advantage of such an arrangement being that the cutting insert can withstand greater cutting forces than when oriented in such a manner that the cutting forces are directed along a minor (thinner) dimension of the cutting insert.

Currently, double-side indexable cutting inserts with multiple cutting edges are relegated to having negative axial rake angles for cutting clearance. By mounting the cutting inserts with a negative axial rake angle, the cutting inserts cannot take complete advantage of the greater cutting forces that the cutting insert can withstand when tangentially mounted in the insert holder or toolholder by taking a limited depth of cut.

BRIEF SUMMARY OF THE INVENTION

Briefly, according to this invention, there is provided an indexable cutting insert, comprising a first component including a top surface and at least one side surface, wherein a first cutting edge is defined at an intersection between the at least one side surface and the top surface; a third component mirror symmetric with respect to the first component about a vertical axis of the cutting insert; and a second component disposed between the first and third components, wherein the first cutting edge defines a positive axial rake angle.

In another aspect of the invention, a toolholder comprises at least one insert pocket capable of receiving an indexable cutting insert. The indexable cutting insert comprises a first component including a top surface and at least one side surface, wherein a first cutting edge is defined at an intersection between the at least one side surface and the top surface; a third component mirror symmetric with respect to the first component about a vertical axis of the cutting insert; and a second component disposed between the first and third components, wherein the first cutting edge defines a positive axial rake angle.

In yet another aspect of the invention, a method of making an indexable cutting insert from three basic components: a first component including a top surface and at least one side surface, wherein at least one cutting edge is defined at an intersection between the at least one side surface and the top surface; a third component being mirror symmetric with respect to the first component about a vertical axis of the cutting insert; and a second component disposed between the first and third components, the method comprising the steps of: rotating the first component about the vertical axis by a first offset angle with respect to a third component; and rotating the second component about the vertical axis at a second offset angle with respect to the first and third components, whereby the at least one cutting edge defines a positive axial rake angle.

BRIEF DESCRIPTION OF THE DRAWINGS

Further features of the present invention, as well as the advantages derived therefrom, will become clear from the following detailed description made with reference to the drawings in which.

DETAILED DESCRIPTION OF THE INVENTION

Referring to the drawings, wherein like reference characters represent like elements, FIGS. 1-4 show a general design concept for creating an indexable cutting insert with positive axial rake and multiple cutting edges, shown generally at 10, according to the invention. In general, the design concept for creating the cutting insert 10 includes three building blocks or components: a first component, shown generally at 12, a center or second component, shown generally at 14, disposed between the first component 12 and a third component shown generally at 16. The third component 16 is substantially identical to the first component 12, with the third component 16 being mirror symmetric to the first component 12 when rotated one hundred eighty (180) degrees about the vertical or y-axis. For brevity, only the first component 12 will be discussed in detail below.

The first component 12 is generally polygonal in shape. In the illustrated embodiment, the first component 12 includes an outer surface that forms a top surface 18 of the cutting insert 10, and the third component includes a similar outer surface that forms a bottom surface 19 (FIG. 4) of the cutting insert 10. It will be appreciated that the bottom surface 19 would become the top surface 18 when the cutting insert 10 is flipped over and the cutting edges of the third component 16 are used for a cutting operation. An aperture 20 is preferably centrally located and aligned on the components 12, 14 and 16 for allowing a fastener (not shown), such as a screw, and the like, to be inserted therethrough for securely holding the cutting insert 10 in the insert pocket 310 of the toolholder 300. It should be noted that the aperture 20 is optional, depending on the type of cutting insert 10 to be designed.

Figure 8:
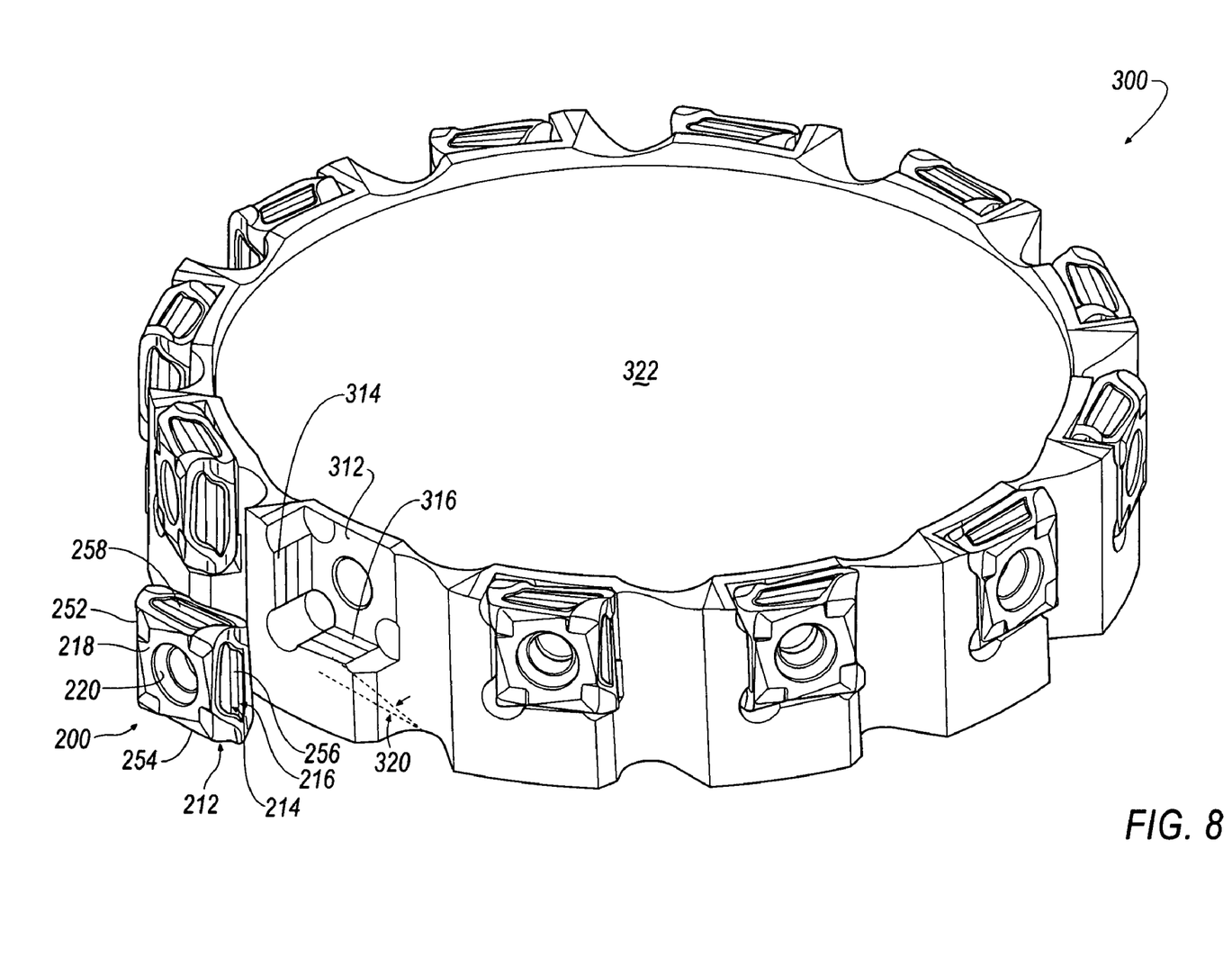
FIG. 8 is a perspective view of the cutting insert of FIG. 7 seated in an insert receiving pocket of a right hand milling toolholder according to an embodiment of the invention.

The first component 12 includes a plurality of sidewalls or side surfaces, shown generally at 22, 24, 26 and 28. In the illustrated embodiment, each of the side surfaces 22, 24, 26 and 28 are substantially identical to each other. For brevity, only the side surface 22 will be discussed in detail. The side surface 22 includes a first substantially planar surface 22a, a first radiused surface 22b, a second radiused or planar surface 22c, and a second substantially planar surface 22d. The first and second radiused surfaces 22b, 22c may form a continuous radiused surface for forming a blend between the first and third planar surfaces 22a, 22d. The purpose of the first and second radiused surfaces 22b, 22c is to provide adequate chip removal during a cutting operation. The side surface 22 forms an axial rake face when the cutting insert 10 is mounted in the insert pocket 310 of a toolholder 300 (FIG. 8). Although the illustrated embodiment shows the surfaces 22a, 24a, 26a and 28a as substantially planar, it is envisioned that one or more of the surfaces 22a, 24a, 26a and 28a may have a serpentine shape, and the like.

A first leading edge or cutting edge 30 is formed at the intersection between the first planar surface 22a of the side surface 22 and the top surface 18. Similarly, a second leading edge or cutting edge 32 is formed at the intersection between the first planar surface 24a of the side surface 24 and the top surface 18, a third leading edge or cutting edge 34 is formed at the intersection between the first planar surface 26a of the side surface 26 and the top surface 18, and a fourth leading edge or cutting edge 36 is formed at the intersection between the first planar surface 28a of the side surface 28 and the top surface 18. Because the third component 16 is substantially identical to the first component 12, the cutting insert 10 has a total of eight cutting edges (2 components×4 cutting edges/component=8 cutting edges). It will be appreciated that the invention can be practiced with fewer or greater number of cutting edges. For example, a cutting insert can be designed with first and third components in the form an equilateral triangle. In this case, the cutting insert would have a total of six cutting edges (2 components×3 cutting edges/component=six cutting edges). In another example, a cutting insert can be designed with ten cutting edges in the case where the first and third components are in the form of a pentagram (2 components×5 cutting edges/component=10 cutting edges). Although the illustrated embodiment has two substantially identical polygon components, it is possible that a cutting insert can be designed with additional polygon components separated by additional center components with a like number of sides.

Figure 1:
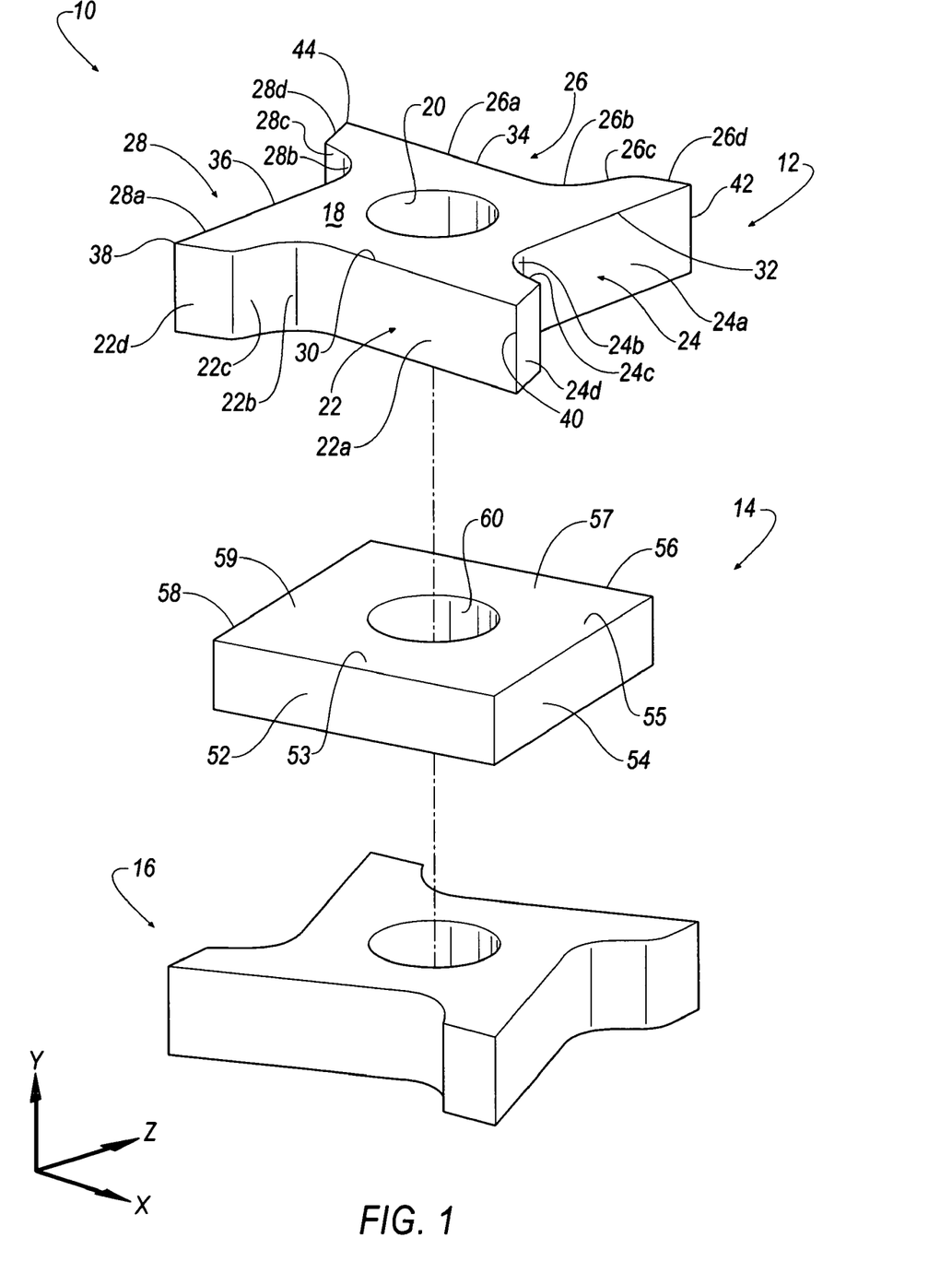
FIG. 1 is an exploded view of a design concept for an indexable cutting insert with positive axial rake and eight cutting edges according to an embodiment of the invention.
Figure 2:
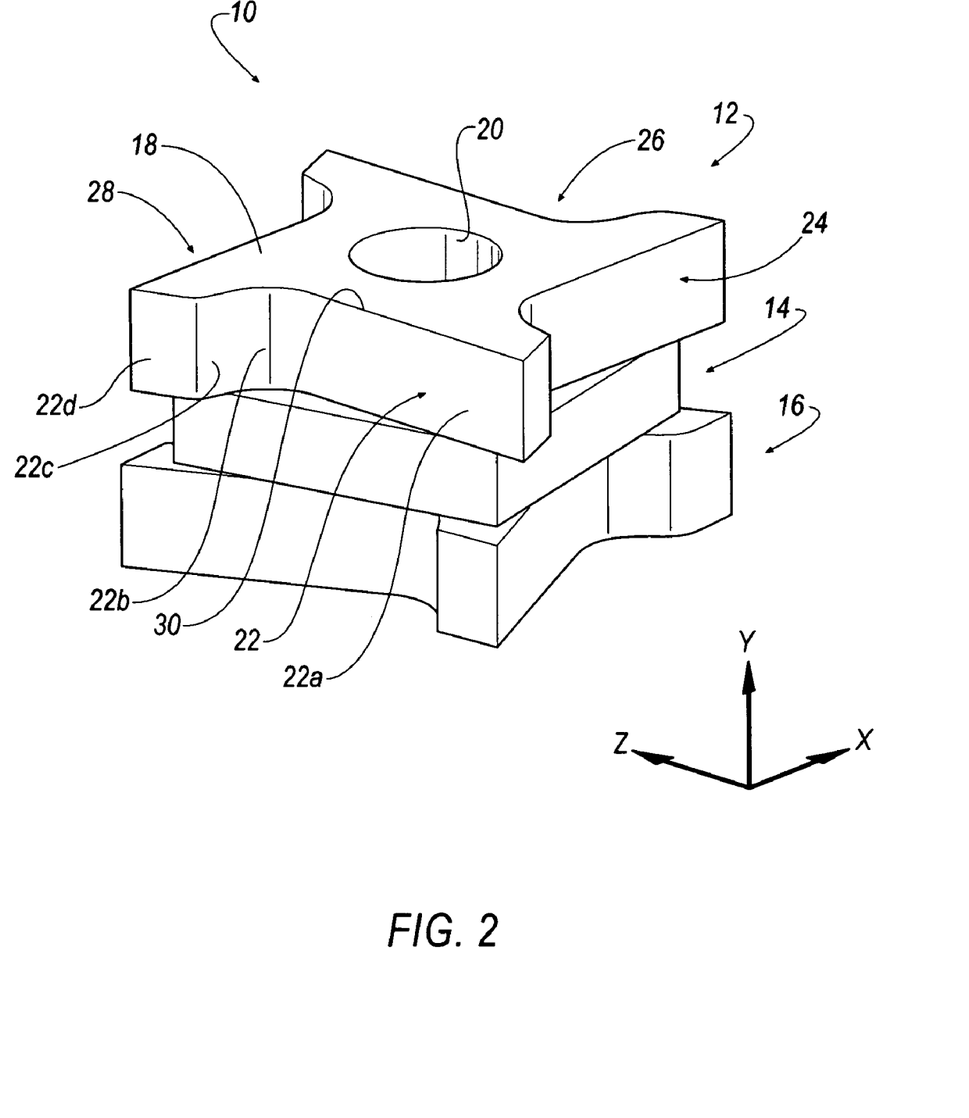
FIG. 2 is a perspective view of the design concept of FIG. 1.
Figure 3:
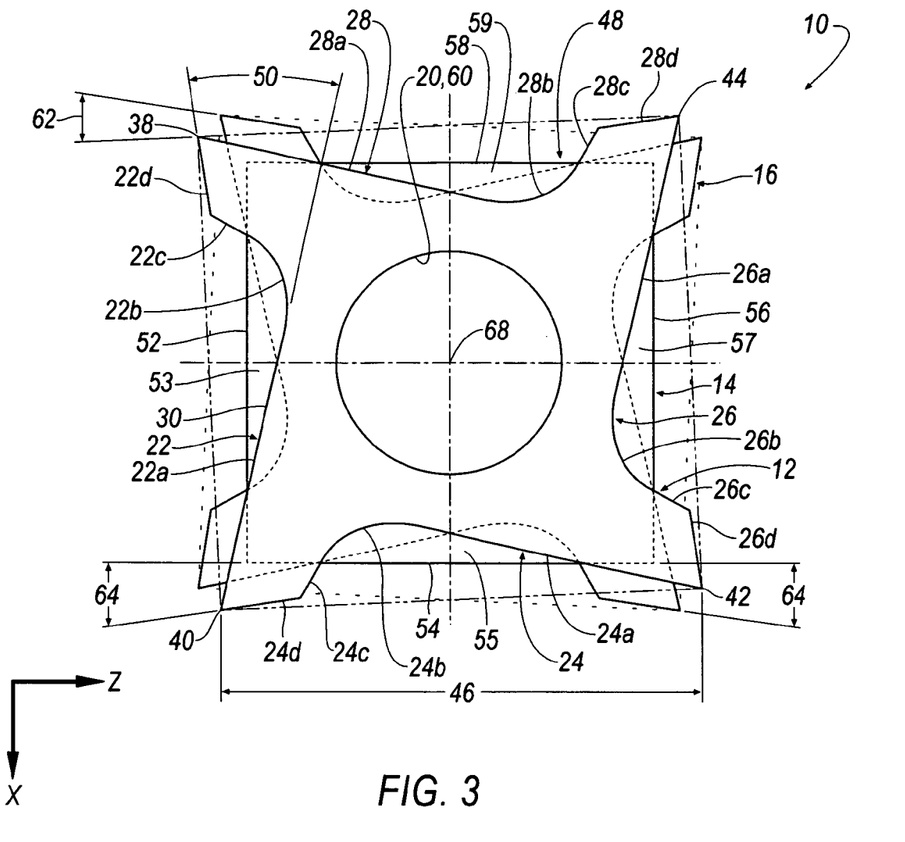
FIG. 3 is a top view of the design concept of FIG. 1.

As shown in FIG. 3, the first (and third) component 12 is generally star-shaped polygon in appearance having four vertexes. A first vertex or nose radius 38 is formed at the intersection between the second planar surface 22d of the side surface 22 and the first planar surface 28a of the adjacent side surface 28. Similarly, a second vertex or nose radius 40 is formed at the intersection between the second planar surface 24d of the side surface 24 and the first planar surface 22a of the adjacent side surface 22, a third vertex or nose radius 42 is formed at the intersection between the second planar surface 26d of the side surface 26 and the first planar surface 24a of the adjacent side surface 24, and a fourth vertex or nose radius 42 is formed at the intersection between the second planar surface 28d of the side surface 28 and the first planar surface 26a of the adjacent side surface 26.

In the illustrated embodiment, a length or distance 46 between the four vertexes 38, 40, 42 and 44 of the first (and third) component 12 is substantially identical forming a square having a dimension of approximately 0.500 inches (12.70 mm). However, it will be appreciated that the distance 46 between the vertexes 38, 40, 42 and 44 need not be equidistant to practice the principles of the invention. For example, the distance between the four vertexes 38, 40, 42 and 44 may form a rectangle in which the vertexes 32 and 38 and the vertexes 34 and 36 have a substantially identical first distance, while the vertexes 32 and 34 and the vertexes 36 and 38 have a substantially identical second distance that is different than the first distance.

In addition, the invention is not limited to the number of vertexes 38, 40, 42 and 44. For example, the principles of the invention can be practiced with the first and third components 12, 16 having three vertexes, which may or may not be equidistant from each other forming a polygon shape of an equilateral triangle. In another example, the first and third components 12, 16 may have five vertexes, which may or may not be equidistant from each other forming a polygon shape of the pentagram. Other polygon shapes are within the contemplation of the invention.

One aspect of the invention is that each cutting edge 30, 32, 34 and 36 has a length that extends from a respective nose radius 38, 40, 42 and 44 to the first radiused surface 22b, 24b, 26b and 28b of the respective side surface 22, 24, 26 and 28. As shown in FIG. 3, the length of each cutting edge 30, 32, 34 and 36 for each component 12, 16 is greater than one-half of an inscribed circle (IC) dimension 48 of the cutting insert 10, unlike conventional insert designs in which the cutting edges are less than or equal to the IC dimension of the cutting insert. This aspect of the invention allows the cutting insert 10 to provide a more aggressive depth of cut for a particular material to be cut, such as steel, and the like, as compared to conventional cutting inserts.

Another aspect of the invention is that each cutting edge 30, 32, 34 and 36 (and each of the four cutting edges of the third component 16) is formed at a positive axial rake angle 50. In the illustrated embodiment, the angle 50 is approximately fifteen (15) degrees; however, the invention is not limited by the angle 50 so long that it is a positive axial rake angle. For example, the positive axial rake angle 50 may be lesser, for example, ten (10) degrees, or greater, for example, twenty (20) degrees, depending on design factors, such as, for example, the material to be cut, the desired depth of cut, and the feed rate for the cutting insert 10. This aspect of the invention also allows the cutting insert 10 to provide a more aggressive depth of cut for a particular material to be cut, such as steel, and the like, as compared to conventional cutting inserts.

The second component 14 comprises generally a square-shaped polygon having four substantially planar sidewalls 52, 54, 56 and 58 that provide an abutment surface for the cutting insert 10 when the cutting insert 10 is mounted in a pocket wall 310 of a toolholder 300 (FIG. 8). For two-point contact, for example, two sidewalls 52, 54, 56 and 58 engage the pocket wall 314, 316 of the toolholder 300 (FIG. 8). In addition, the second component 14 includes a top surface 53, 55, 57 and 59 (as viewed in FIG. 3) to form part of a radius blend with respective side surfaces 22, 24, 26 and 28 of the first component 12 for effective chip control and evacuation. It will be appreciated that the bottom surface (out of view) of the second component 12 also forms part of the radius blend with respective side surfaces of the third component 16. Similar to the components 12, 16, the second component 14 includes an aperture 60 that corresponds in size and shape to the aperture 20 of the first and second components 12, 16. It should be noted that the length of the sidewalls 52, 54, 56 and 58 of the second component 14 is less than the distance 46 between the vertexes 38, 40, 42 and 44 of the first and third components 12, 16.

As seen in FIG. 3, the first and third components 12, 16 are rotated or offset relative to one another by an offset angle 62 when the first, second and third components 12, 14, 16 are properly aligned with each other. The purpose of the offset angle 62 is to prevent the vertex or nose radius of the third component 16 that is directly below the cutting edge 22a, for example, from dragging against the workpiece (not shown) when the cutting edge 22a is engaging the workpiece. In the illustrated embodiment, the offset angle 62 is approximately five (5) degrees. However, the invention can be practiced with any desired angle, depending on the specific design requirements of the cutting insert 10, such as, depth of cut, and the like.

In addition, the second component 14 is rotated or offset relative to the first and third components 12, 16 by an offset angle 64 to allow the cutting insert 10 to be indexable. In other words, the offset angle 64 allows for the first and third components 12, 16 to the cutting insert 10 to be seated properly in the insert pocket 310 of the toolholder 300 (FIG. 8). It is recommended that the offset angle 64 of the second component 14 is approximately one-half of the offset angle 62 of the first and third components 12, 16. In illustrated embodiment, the offset angle 64 is approximately two and one-half degrees (2 degrees 30 seconds) because the first and third components 12, 16 are offset at the offset angle 62 of approximately five (5) degrees. By offsetting the second component 14 by approximately one-half of the offset of the first and third components 12, 16, the cutting insert 10 can be flipped one hundred eighty (180) degrees so that the cutting edges 30, 32, 34 and 36 on the first and third components 12, 16 can be used for a total of eight cutting edges. It should be noted that the first, second and third components 12, 14 and 16 are concentrically rotated about a center, vertical or y-axis 68 of the cutting insert 10 to achieve the offset angles 62, 64.

Figure 4:
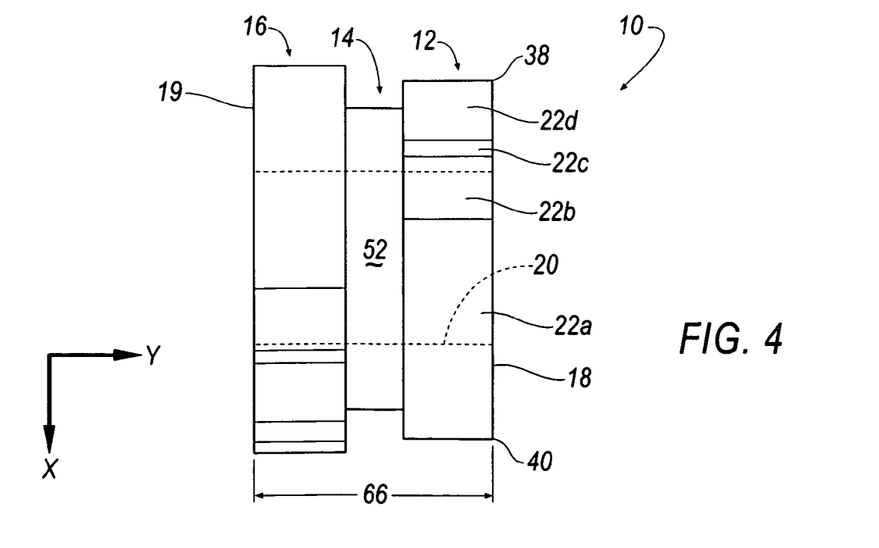
FIG. 4 is a side view of the design concept of FIG. 1.

As shown in FIG. 4, when the first, second and third components 12, 14 and 16 are properly aligned, a thickness 66 of the cutting insert 10 is approximately one-half of the distance 46 between the vertexes 38, 40, 42 and 44 of the first and third components 12, 16. In the illustrated embodiment, the thickness 66 is approximately 0.250 inches (6.35 mm). However, the thickness 66 can be any desirable thickness 66 so long as the cutting insert 10 has adequate structural strength to adequately perform the intended cutting operation.

FIGS. 1-4 illustrate the design concept for the indexable cutting insert 10 with a positive axial rake angle and multiple cutting edges that is formed from three building blocks or components 12, 14 or 16. Using the principles of the design concept described above, many different designs for an indexable cutting insert with a positive axial rake angle and multiple cutting edges can be achieved.

Figure 5:
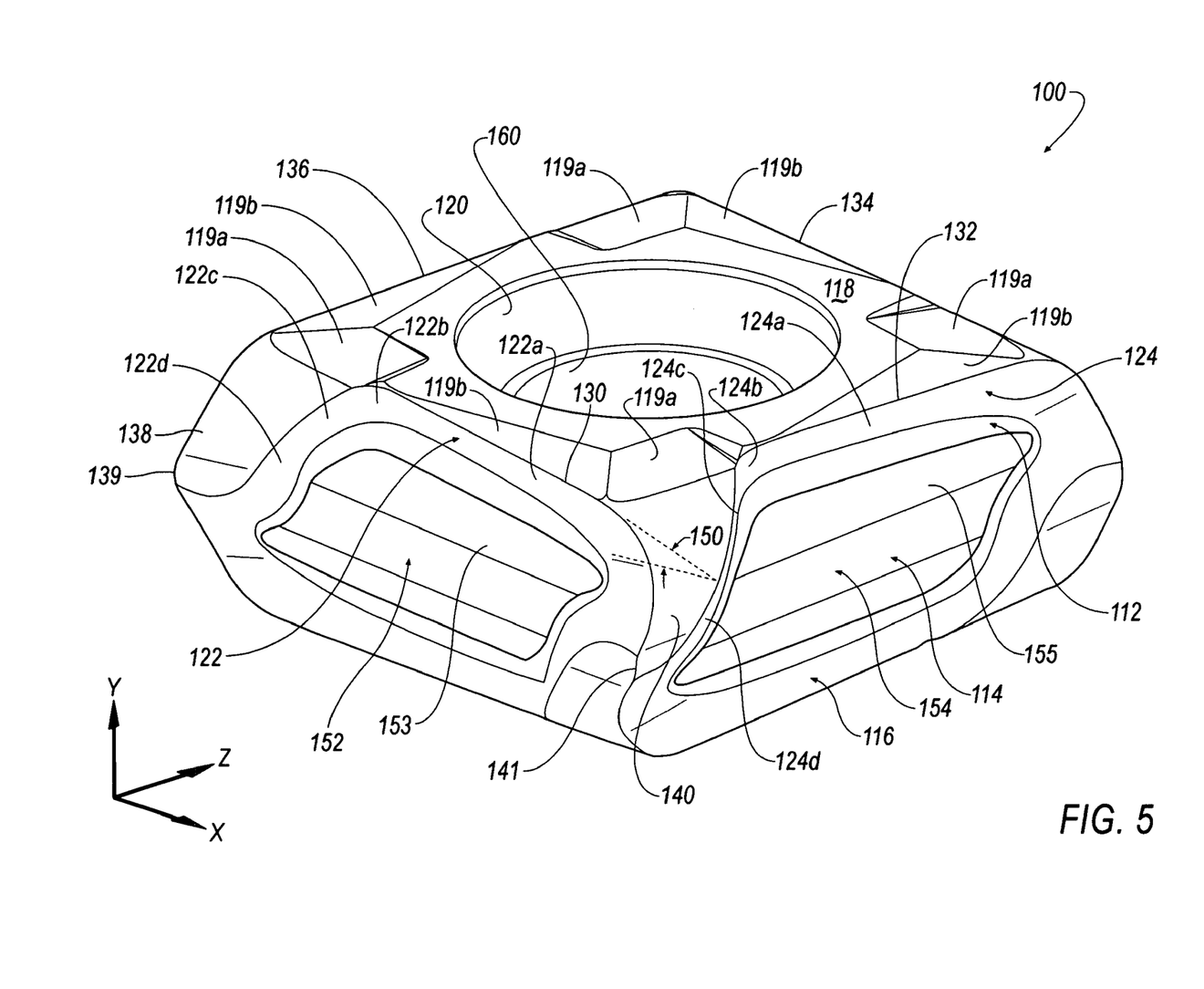
FIG. 5 is a perspective view of an example of an indexable cutting insert with positive axial rake and eight cutting edges using the principles of the design concept according to an embodiment of the invention.

For example, the principles of the design concept of the invention can be used achieve a cutting insert 100, shown in FIG. 5. For clarity, a value of one hundred has been added to the reference numbers for the cutting insert 100 to like elements of the cutting insert 10. The cutting insert 100 includes the three basic polygon components 112, 114, 116 with the components 112, 116 having a star appearance being mirror-symmetric when rotated about the vertical or y-axis. For brevity, only the first component 112 will be discussed in detail below. As illustrated, the first component 112 includes an outer surface that forms a top surface 118 of the cutting insert 100 and the third component includes an outer surface that forms a bottom surface 119 of the cutting insert 100. Of course, the bottom surface 119 will become the top surface when the cutting insert 100 is removed from the insert pocket 310, rotated one hundred eight (180) degrees, and then mounted in the insert pocket 310 (FIG. 8). An optional aperture 120 is preferably centrally located and passes through the first, second and third components 112, 114 and 116. The top and bottom surfaces 118, 119 may include one or more relief surfaces or clearance faces 119a, 119b to provide a clearance for the cutting insert 100 when mounted in the insert pocket 310 of the toolholder 300 (FIG. 8).

The first component 112 includes a plurality of axial rake faces or side surfaces, shown generally at 122, 124, 126 (out of view) and 128 (out of view). In the illustrated embodiment, each of the axial rake faces or side surfaces 122, 124, 126 and 128 are substantially identical to each other. For brevity, only the side surface 122 will be discussed in detail. The side surface 122 includes a first substantially planar surface 122a, a first radiused surface 122b, a second radiused surface 122c, and a second substantially planar surface 122d. The first and second radiused surfaces 122b, 122c may form a continuous radiused surface for forming a blend between the first and third planar surfaces 122a, 122d. Although the illustrated embodiment shows the surface 122a as substantially planar, it is envisioned that the surface 122a may have a serpentine shape, S-shape, and the like.

A first leading edge or cutting edge 130 is formed at the intersection between the first planar surface 122a of the side surface 122 and the top surface 118. Similarly, a second, third and fourth leading edges or cutting edges 132, 134 and 136 are formed at the intersection between the first planar surfaces 124a, 126a and 128a of the side surfaces 124, 126 and 128 and the top surface 118. Because the third component 116 is substantially identical to the first component 112, the cutting insert 100 has a total of eight cutting edges (2 components×4 cutting edges/component=8 cutting edges).

A radiused blend 153 is formed by the second component 114 and extends between the side surface 122 of the first component 112 and the sidewall 152 of the second component 114. The radiused blend 153 cooperates with the radiused side surfaces 122b and 122c of the first component 112 for effective chip control. In the illustrated embodiment, the radiused blend 153 has an S-shaped profile; however, other shapes are contemplated by the invention. Similarly, a radiused blend 155 is formed by the second component 114 and extends between the side surface 124 of the first component 112 and the sidewall 154 of the second component 114. Likewise, a radiused blend 157 (out of view) is formed by the second component 114 and extends between the side surface 126 of the first component 112 and the sidewall 156 of the second component 114, and a radiused blend 159 (out of view) is formed by the second component 114 and extends between the side surface 128 of the first component 112 and the sidewall 158 of the second component 114.

A first vertex or nose radius 138 is formed at the intersection between the second planar surface 122d of the side surface 122 and the first planar surface 128a of the adjacent side surface 128. Similarly, a second vertex or nose radius 140 is formed at the intersection between the second planar surface 124d of the side surface 124 and the first planar surface 122a of the adjacent side surface 122, a third vertex or nose radius 142 is formed at the intersection between the second planar surface 126d of the side surface 126 and the first planar surface 124a of the adjacent side surface 124, and a fourth vertex or nose radius 144 is formed at the intersection between the second planar surface 128d of the side surface 128 and the first planar surface 126a of the adjacent side surface 126.

In addition, a first wiper edge 139 is formed at the intersection between the nose radius 138 and the sidewalls 152, 158 of the second component 114. Similarly, a second wiper edge 141 is formed at the intersection between the nose radius 140 and the sidewalls 152, 154 of the second component 114, a third wiper edge 143 (out of view) is formed at the intersection between the nose radius 142 and the sidewalls 154, 156 of the second component 114, and a fourth wiper edge 143 (out of view) is formed at the intersection between the nose radius 144 and the sidewalls 156, 158 of the second component 114.

By using the design concept of the invention, each cutting edge 130, 132, 134 and 136 has a length that extends from a respective nose radius 138, 140, 142 and 144 to the first radiused surface 122b, 124b, 126b and 128b of the respective side surface 122, 124, 126 and 128. The length of each cutting edge 130, 132, 134 and 136 is greater than one-half of an inscribed circle (IC) dimension of the cutting insert 100 to provide a more aggressive depth of cut for a particular material to be cut as compared to conventional insert designs.

Another aspect of the invention is that each cutting edge 130, 132, 134 and 136 (and each of the four cutting edges of the third component 116) is formed at a positive axial rake angle 150. In the illustrated embodiment, the angle 150 is approximately fifteen (15) degrees; however, the invention is not limited by the angle 150 so long that it is a positive axial rake angle. For example, the positive axial rake angle 150 may be any angle greater than zero (0) degrees, depending on design factors, such as, for example, the material to be cut, the desired depth of cut, and the feed rate for the cutting insert 100. This aspect of the invention also allows the cutting insert 100 to provide a more aggressive depth of cut for a particular material to be cut, such as steel, and the like, as compared to conventional cutting inserts.

Figure 6:
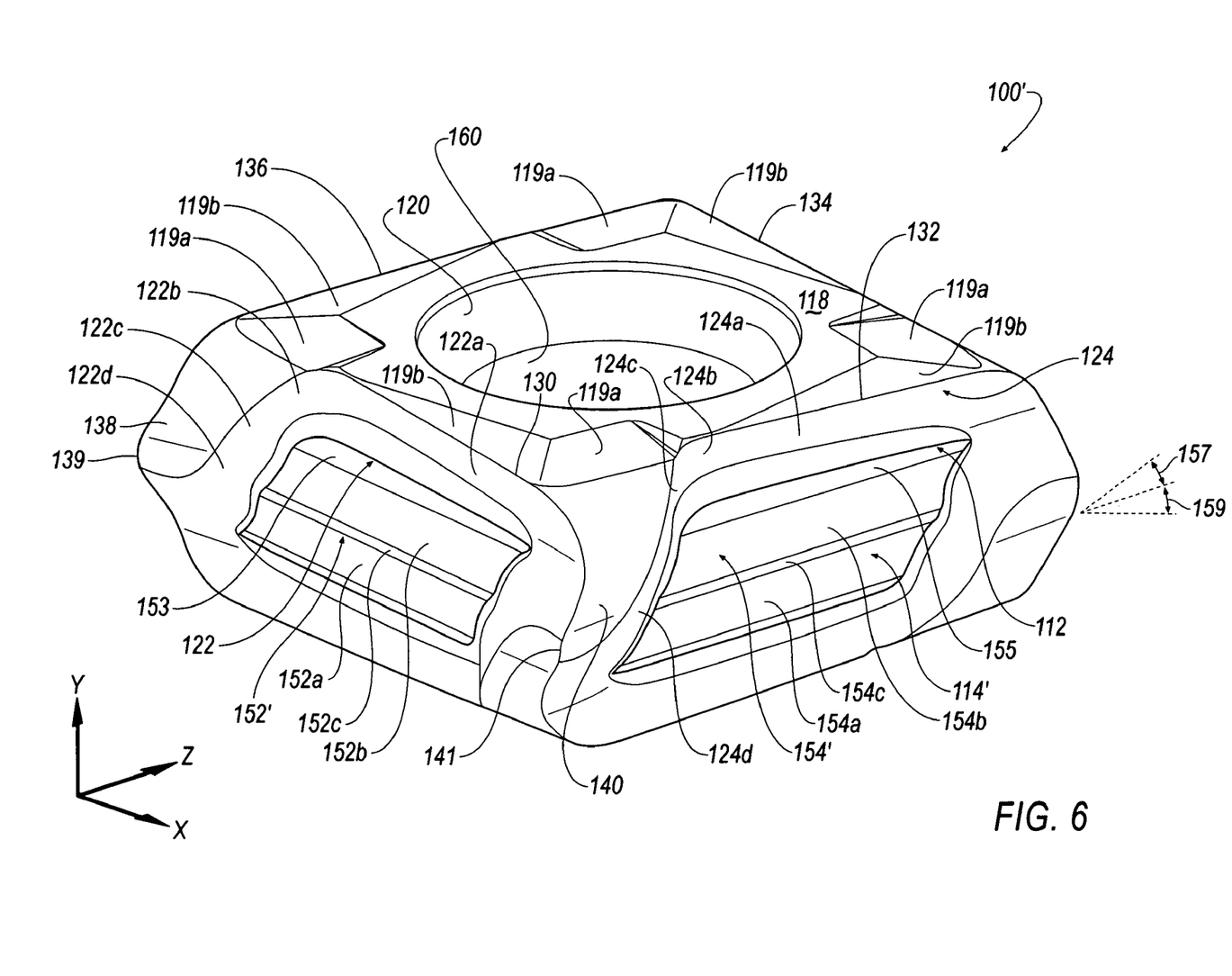
FIG. 6 is a perspective view of an example of an indexable cutting insert with positive axial rake and eight cutting edges using the principles of the design concept according to an embodiment of the invention.

In another example, the principles of the design concept of the invention can be used to achieve a cutting insert 100', shown in FIG. 6. The cutting insert 100' is substantially identical to the cutting insert 100, except that the second component 114' of the cutting insert 100' is different than the second component 114 of the cutting insert 100. As described above, the sidewalls 152, 154, 156 (out of view) and 158 (out of view) of the second component 114 are substantially flat or planar with respect to the longitudinal or z-axis. In the embodiment of FIG. 6, the sidewall 152', for example, has been replaced with a pair of tapered or angled sidewalls 152a, 152b that are separated by a radiused blend 152c. Similarly, the sidewall 154' is replaced with a pair of angled sidewalls 154a, 154b that are separated by a radiused blend 154c. The sidewalls 156', 158' (out of view) are also replaced with angled sidewalls 156a, 156b, 158a, 158b that are separated by radiused blends 156c, 158c, respectively.

In the illustrated embodiment, the angled sidewall 152a is formed at a seating angle 157 of approximately ten (10) degrees with respect to the longitudinal or z-axis. Similarly, the angled sidewalls 154a, 156a (out of view) and 158a (out of view) are formed at a seating angle 157 of approximately ten (10) degrees. The angled sidewall 152b is also formed at a seating angle 159 of approximately ten (10) degrees. Similarly, the angled sidewalls 154b, 156b (out of view) and 158b (out of view) are at a seating angle 159 of approximately ten (10) degrees. The seating angles 157, 159 of the sidewalls 152', 154', 156' and 158' help "dovetail" the cutting insert 100' into the insert pocket 310 of the toolholder 300 (FIG. 8). In this embodiment, the sidewalls or seating pads 314, 316 of the insert pocket 310 would have the same seating angles 157, 159, instead of being substantially planar for seating the cutting insert 100. The seating angles 157, 159 hold the cutting insert 100' into the workpiece more securely and reduce the load on the fastener (not shown) that holds the cutting insert 100' in the insert pocket 310. As a result, the cutting insert 100' would provide an advantage over the cutting insert 100 when used in heavy milling and higher RPM machining applications.

In the illustrated embodiment, the angles 157, 159 are substantially identical. However, the angle 159 may be different than the angle 157. Further, the angles 157, 159 may be any desirable angle other than ten (10) degrees, depending on the desired cutting operation performed by the cutting insert 100'.

Figure 7:
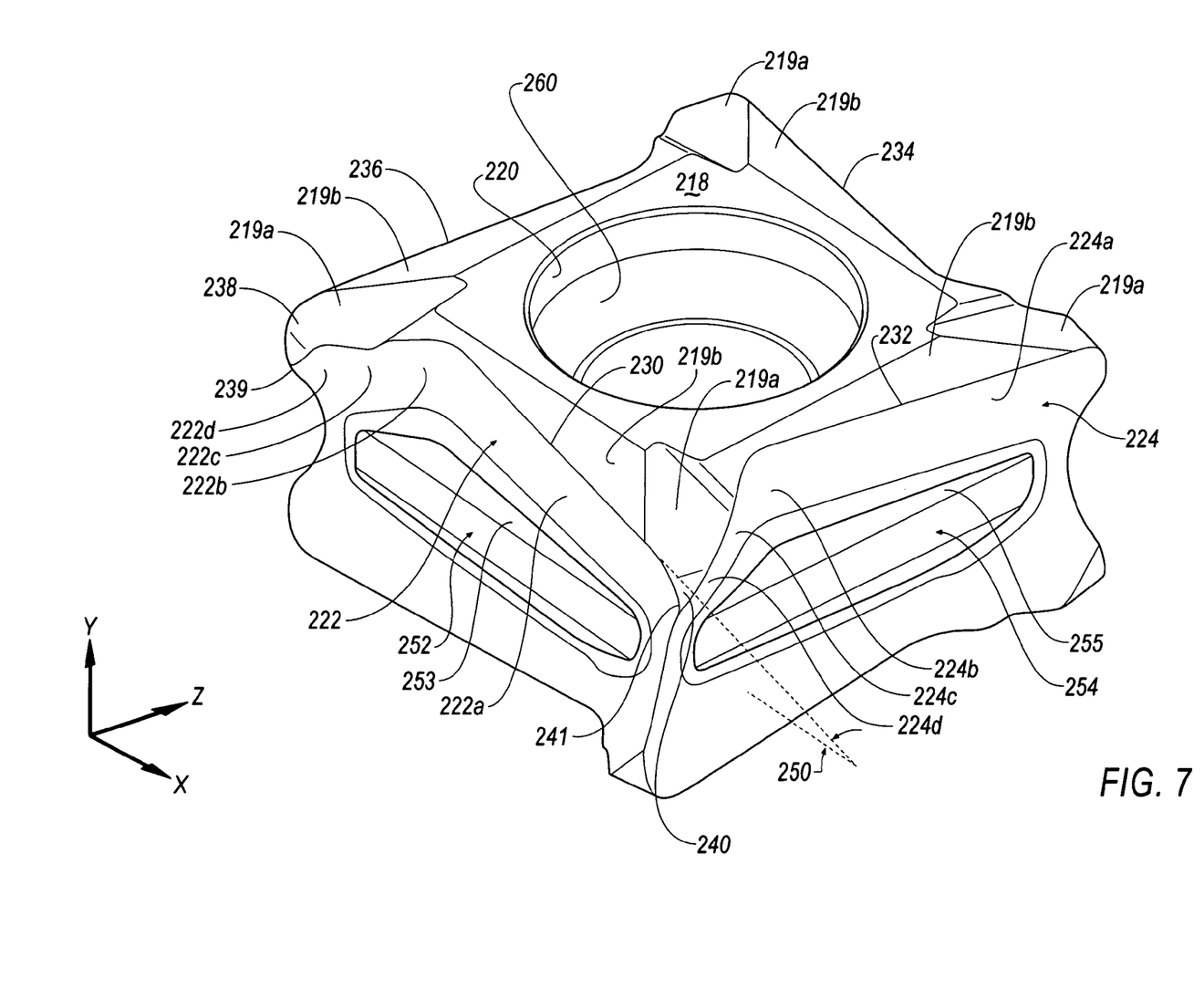
FIG. 7 is a perspective view of an example of an indexable cutting insert with positive axial rake and eight cutting edges using the principles of the design concept according to an embodiment of the invention.

In yet another example, the principles of the design concept of the invention can be used achieve a cutting insert 200, shown in FIGS. 7 and 8. For clarity, a value of two hundred has been added to the reference numbers for the cutting insert 200 to like elements of the cutting insert 10. The cutting insert 200 includes the three basic polygon components 212, 214, 216 with the components 212, 216 having a star appearance being mirror-symmetric when rotated about the vertical or y-axis 64. For brevity, only the first component 212 will be discussed in detail below. As illustrated, the first component 212 includes an outer surface that forms a top surface 218 of the cutting insert 200 and the third component includes an outer surface that forms a bottom surface 219 of the cutting insert 200. Of course, the bottom surface 219 will become the top surface when the cutting insert 200 is removed from the insert pocket 310, rotated one hundred eight (180) degrees, and then mounted in the insert pocket. An optional aperture 220 is preferably centrally located and passes through the first, second and third components 212, 214 and 216. The top and bottom surfaces 218, 219 may include one or more relief surfaces or clearance faces 219a, 219b to provide a clearance for the cutting insert 200 when mounted in the insert pocket 310 of the toolholder 300.

The first component 212 includes a plurality of axial rake faces or side surfaces, shown generally at 222, 224, 226 (out of view) and 228 (out of view). In the illustrated embodiment, each of the axial rake faces or side surfaces 222, 224, 226 and 228 are substantially identical to each other. For brevity, only the side surface 222 will be discussed in detail. The side surface 222 includes a first substantially planar surface 222a, a first radiused surface 222b, a second radiused surface 222c, and a second substantially planar surface 122d. The first and second radiused surfaces 222b, 222c may form a continuous radiused surface for forming a blend between the first and third planar surfaces 222a, 222d. Although the illustrated embodiment shows the surface 222a as substantially planar, it is envisioned that the surface 222a may have a serpentine shape, S-shape, and the like.

A first leading edge or cutting edge 230 is formed at the intersection between the first planar surface 222a of the side surface 222 and the top surface 218. Similarly, a second, third and fourth leading edges or cutting edges 232, 234 and 236 are formed at the intersection between the first planar surfaces 224a, 226a and 228a of the side surfaces 224, 226 and 228 and the top surface 218. Because the third component 216 is substantially identical to the first component 212, the cutting insert 200 has a total of eight cutting edges (2 components×4 cutting edges/component=8 cutting edges).

A radiused blend 253 is formed by the second component 214 and extends between the side surface 222 of the first component 212 and the sidewall 252 of the second component 214. The radiused blend 253 cooperates with the radiused side surfaces 222b and 222c of the first component 212 for effective chip control. In the illustrated embodiment, the radiused blend 253 has an S-shaped profile; however, other shapes are contemplated by the invention. Similarly, a radiused blend 255 is formed by the second component 214 and extends between the side surface 224 of the first component 212 and the sidewall 254 of the second component 214. Likewise, a radiused blend 257 (out of view) is formed by the second component 214 and extends between the side surface 226 of the first component 212 and the sidewall 256 of the second component 214, and a radiused blend 259 (out of view) is formed by the second component 214 and extends between the side surface 228 of the first component 212 and the sidewall 258 of the second component 214.

A first vertex or nose radius 238 is formed at the intersection between the second planar surface 222d of the side surface 222 and the first planar surface 228a of the adjacent side surface 228. Similarly, a second vertex or nose radius 240 is formed at the intersection between the second planar surface 224d of the side surface 224 and the first planar surface 222a of the adjacent side surface 222, a third vertex or nose radius 242 is formed at the intersection between the second planar surface 226d of the side surface 226 and the first planar surface 224a of the adjacent side surface 224, and a fourth vertex or nose radius 244 is formed at the intersection between the second planar surface 228d of the side surface 228 and the first planar surface 226a of the adjacent side surface 226.

In addition, a first wiper edge 239 is formed at the intersection between the nose radius 238 and the sidewalls 252, 258 of the second component 214. Similarly, a second wiper edge 241 is formed at the intersection between the nose radius 240 and the sidewalls 252, 254 of the second component 214, a third wiper edge 243 (out of view) is formed at the intersection between the nose radius 242 and the sidewalls 254, 256 of the second component 214, and a fourth wiper edge 243 (out of view) is formed at the intersection between the nose radius 244 and the sidewalls 256, 258 of the second component 214.

By using the design concept of the invention, each cutting edge 230, 232, 234 and 236 has a length that extends from a respective nose radius 238, 240, 242 and 244 to the first radiused surface 222b, 224b, 226b and 228b of the respective side surface 222, 224, 226 and 228. The length of each cutting edge 230, 232, 234 and 236 is greater than one-half of an inscribed circle (IC) dimension of the cutting insert 200 to provide a more aggressive depth of cut for a particular material to be cut as compared to conventional insert designs.

Another aspect of the invention is that each cutting edge 230, 232, 234 and 236 (and each of the four cutting edges of the third component 216) is formed at a positive axial rake angle 250. In the illustrated embodiment, the angle 250 is approximately fifteen (15) degrees; however, the invention is not limited by the angle 250 so long that it is a positive axial rake angle. For example, the positive axial rake angle 250 may be any angle greater than zero (0) degrees, depending on design factors, such as, for example, the material to be cut, the desired depth of cut, and the feed rate for the cutting insert 200. This aspect of the invention also allows the cutting insert 200 to provide a more aggressive depth of cut for a particular material to be cut, such as steel, and the like, as compared to conventional cutting inserts.

As shown in FIG. 8, the toolholder 300 is shown having one or more insert receiving pockets 310 for securely mounting the cutting insert 10, 100, 200 of the invention. For illustration purposes only, the cutting insert 200 is shown being tangentially mounted in the insert pocket 310 of a right-hand milling cutter. However, it will be appreciated that the cutting inserts 10, 100, 200 can be also mounted in a left-hand toolholder, such as a left-hand milling cutter, and the like, by designing the inserts 10, 100, 200 to be mirror symmetric about the z-axis. Each insert pocket 310 includes a bottom wall 312, and at least two sidewalls 314, 316. In the illustrated embodiment, the sidewalls 314, 316 are at an approximately ninety (90) degree angle with respect to each other. When mounted in the insert pocket 310, two of the sidewalls 252, 254 (out of view) of the cutting insert 200 abut the sidewalls 314, 316 of the insert pocket 310 to provide a two-point contact for the cutting insert 200. Further, the bottom face 219 of the cutting insert 200 abuts the bottom wall 312 of the insert pocket 310.

As illustrated, the cutting insert 200 is mounted in the insert pocket 310 at a negative angle 320 of approximately five (5) degrees such that the vertex 238 of the cutting insert 200 is slightly below an outer surface 322 of the toolholder 300. As a result of mounting the cutting insert 200 at the negative angle 320 in the insert pocket 310, the cutting insert 200 provides a net positive axial rake angle of approximately ten (10) degrees (15−5=10). It will be appreciated that the net positive axial rake angle can be any desirable positive axial rake angle, depending on the amount of positive axial rake provided by the cutting insert 10, 100, 200 and the amount of negative angle 320 of the insert pocket 310.

Figure 9:
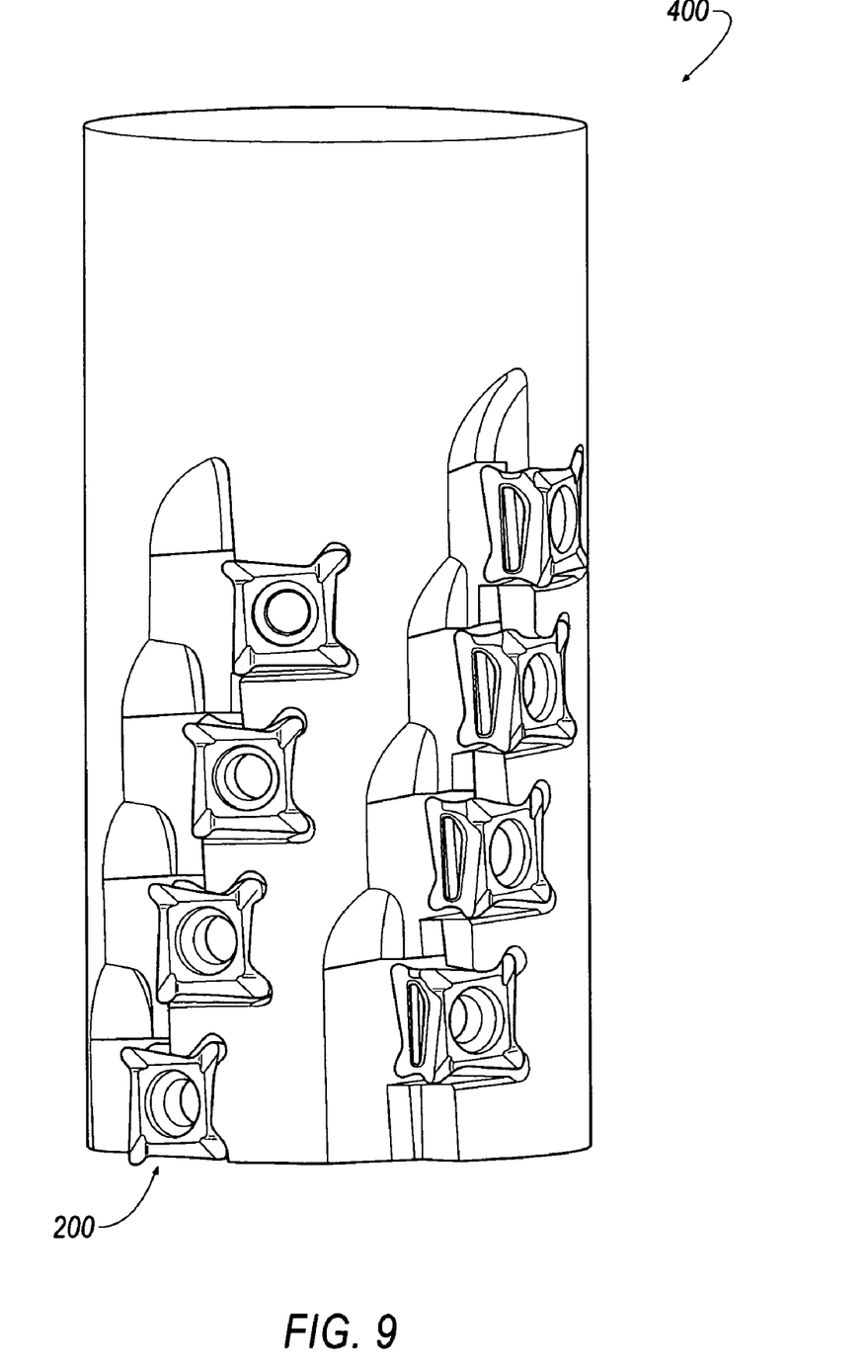
FIG. 9 is a perspective view of the cutting insert of FIG. 7 seated in an insert receiving pocket of a right hand helical endmill according to an embodiment of the invention.

Other mounting arrangements for the cutting inserts 10, 100, 200 are within the scope of the invention. For example, the cutting insert 200 can be helically arranged and tangentially mounted on an endmill toolholder 400, as shown in FIG. 9.

As described above, the indexable cutting insert 10, 100, 200 includes multiple cutting edges with a positive axial rake angle when mounted in the insert pocket of a toolholder. By providing a positive axial rake angle, the cutting insert allows for a more aggressive axial depth of cut when compared to conventional cutting inserts with negative axial rake angles.

The documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

What is claimed is:

1. An indexable cutting insert, comprising:
   a first component including a top surface and at least one side surface, wherein at least one cutting edge is defined at an intersection between the at least one side surface and the top surface;
   a third component being mirror symmetric with respect to the first component about a vertical axis of the cutting insert; and
   a second component disposed between the first and third components,
   wherein the at least one cutting edge defines a positive axial rake angle, and
   wherein the first and third components are offset from each other by a first offset angle, and wherein the second component is offset from the first and third components by a second offset angle.

2. The cutting insert according to claim 1, wherein a length of the at least one cutting edge is greater than one-half of an inscribed circle (IC) dimension of the cutting insert.

3. The cutting insert according to claim 1, wherein the second offset angle is one-half the first offset angle.

4. The cutting insert according to claim 1, wherein the at least one side surface includes a first substantially planar surface extending from a first vertex of the cutting insert to a first radiused surface, a second radiused or planar surface extending from the first radiused surface to a second substantially planar surface, the second substantially planar surface extending to a second vertex.

5. The cutting insert according to claim 1, wherein the first and third components include four vertexes, and wherein a length between each vertex is approximately equal to each other.

6. The cutting insert according to claim 5, wherein the second component includes a plurality of substantially planar sidewalls, and wherein each of the sidewalls are approximately equal in length.

7. The cutting insert according to claim 6, wherein the length between each vertex of the first and third components is greater than the length of each sidewall of the second component.

8. The cutting insert according to claim 5, wherein the second component includes a plurality of substantially planar sidewalls, and wherein each sidewall includes a pair of angled sidewalls.

9. A toolholder, comprising:
at least one insert pocket capable of receiving an indexable cutting insert; said indexable cutting insert comprising:
a first component including a top surface and at least one side surface, wherein at least one cutting edge is defined at an intersection between the at least one side surface and the top surface;
a third component being mirror symmetric with respect to the first component about a vertical axis of the cutting insert; and
a second component disposed between the first and third components,
wherein the at least one cutting edge defines a positive axial rake angle, and
wherein the first and third components are offset from each other by a first offset angle, and wherein the second component is offset from the first and third components by a second offset angle.

10. The toolholder according to claim 9, wherein a length of the at least one cutting edge is greater than one-half of an inscribed circle (IC) dimension of the cutting insert.

11. The toolholder according to claim 9, wherein the second offset angle is one-half the first offset angle.

12. The toolholder according to claim 9, wherein the at least one side surface includes a first substantially planar surface extending from a first vertex of the cutting insert to a first radiused surface, a second radiused or planar surface extending from the first radiused surface to a second substantially planar surface, the second substantially planar surface extending to a second vertex.

13. The toolholder according to claim 9, wherein the first and third components include four vertexes, and wherein a length between each vertex is approximately equal to each other.

14. The toolholder according to claim 13, wherein the second component includes a plurality of substantially planar sidewalls, and wherein each of the sidewalls are approximately equal in length.

15. The toolholder according to claim 14, wherein the length between each vertex of the first and third components is greater than the length of each sidewall of the second component.

16. A method of making an indexable cutting insert from three basic components: a first component including a top surface and at least one side surface, wherein at least one cutting edge is defined at an intersection between the at least one side surface and the top surface; a third component being mirror symmetric with respect to the first component about a vertical axis of the cutting insert; and a second component disposed between the first and third components, the method comprising the steps of:
rotating the first component about the vertical axis by a first offset angle with respect to a third component; and
rotating the second component about the vertical axis at a second offset angle with respect to the first and third components,
whereby the at least one cutting edge defines a positive axial rake angle.

17. The method according to claim 16, wherein the first offset angle is greater than the second offset angle.

18. The method according to claim 17, wherein the first offset angle is twice the second offset angle.

* * * * *